United States Patent
Magnusson

[19]

[11] Patent Number: 6,079,119
[45] Date of Patent: Jun. 27, 2000

[54] METHOD AND A DEVICE FOR DRYING

[76] Inventor: Börje Magnusson, Domängatan 35, Hörby 242 32, Sweden

[21] Appl. No.: 09/101,711
[22] PCT Filed: Jan. 17, 1997
[86] PCT No.: PCT/SE97/00077
§ 371 Date: Jul. 16, 1998
§ 102(e) Date: Jul. 16, 1998
[87] PCT Pub. No.: WO97/30318
PCT Pub. Date: Aug. 21, 1997

[30] Foreign Application Priority Data

Jan. 18, 1996 [SE] Sweden .................................. 9600175

[51] Int. Cl.[7] ........................................................ F26B 7/00
[52] U.S. Cl. .............................. 34/383; 34/439; 34/440; 34/507; 34/240
[58] Field of Search .............................. 34/381, 383, 385, 34/413, 417, 437, 439, 440, 807, 104, 107, 174, 175, 239, 240; 414/24.5; 56/432, 473.5, 474; 53/428, 425, 434, 436; 241/18, 23, 24.29, 60, 73

[56] References Cited

U.S. PATENT DOCUMENTS

| | | | |
|---|---|---|---|
| 1,930,392 | 10/1933 | Kyoostra | 34/439 X |
| 1,999,585 | 4/1935 | Bruggeman | 34/439 X |
| 5,394,621 | 3/1995 | Levy | 34/440 X |
| 5,540,143 | 7/1996 | Stromer et al. | 56/341 X |
| 5,833,424 | 11/1998 | Bales | 414/24.5 |

FOREIGN PATENT DOCUMENTS

| | | |
|---|---|---|
| 1098274 | of 1961 | Germany . |
| 2207495 | of 1989 | United Kingdom . |

OTHER PUBLICATIONS

Derwent's Abstract, No. 92–257171/31, week 9231, Abstract of SU, 1674737 (Feedstuff Res Inst (FEEDx)), Sep. 7, 1991.

Derwent's Abstract, No. 88–328617/46, week 8846, Abstract of SU, 1393348 (Non–Black Zone Agric (UAGM)), May 7, 1988.

*Primary Examiner*—Stephen Gravini
*Attorney, Agent, or Firm*—Pollock, Vande Sande & Amernick

[57] ABSTRACT

A method and device for simultaneous drying bodies of air-permeable material, comprises providing a hole in each body, the hole containing a tube having an air permeable mantle and placing the bodies adjacent each other so that the holes thereof form a continuous chamber, interconnecting two adjacent bodies by connecting the tubes belonging to the two, adjacent bodies by interconnecting members so that the two bodies abut against each other while preventing undue air leakage therebetween, the interconnecting members being arranged to allow, with a relatively small resistance, movement of the tubes towards each other but to counteract, with a relatively great resistance, movement of the tubes away from each other and establishing a pressure difference between the hole in each body and the surroundings of the body for generating a drying air flow through the body.

29 Claims, 8 Drawing Sheets

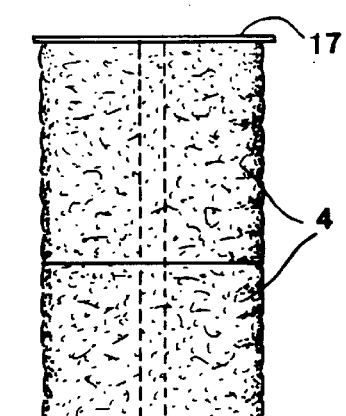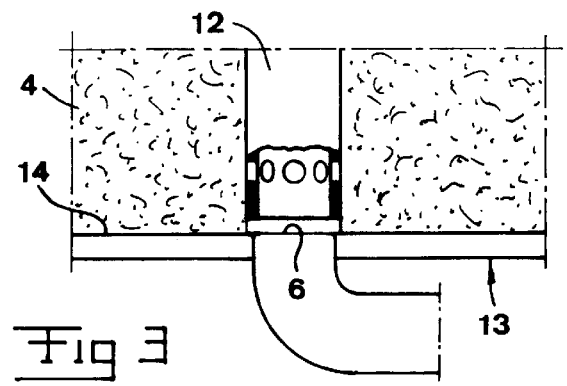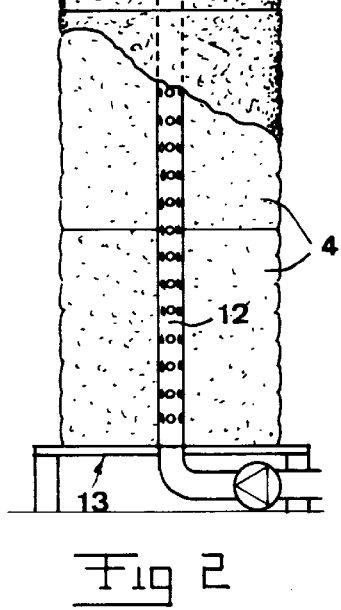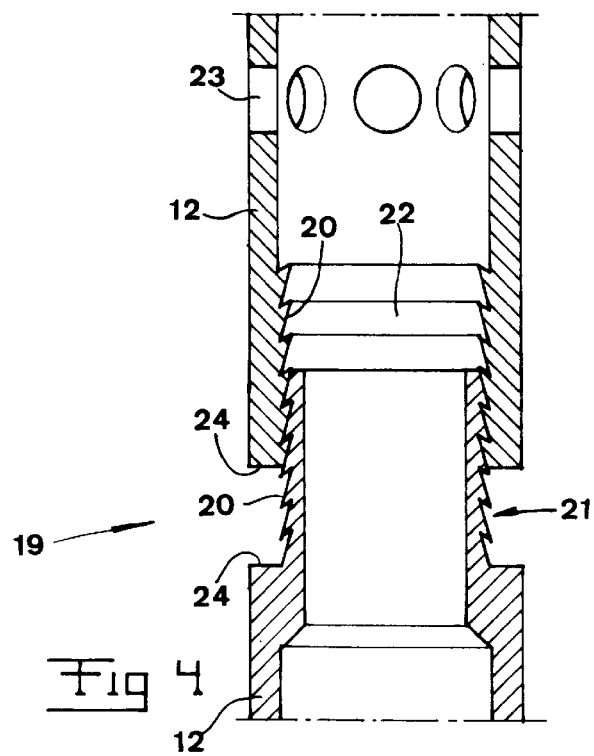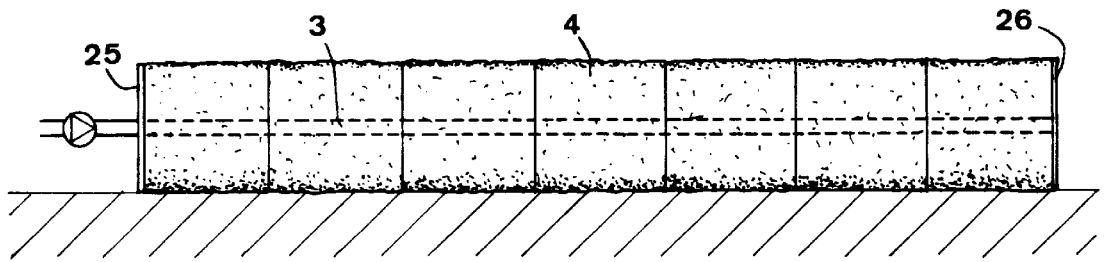

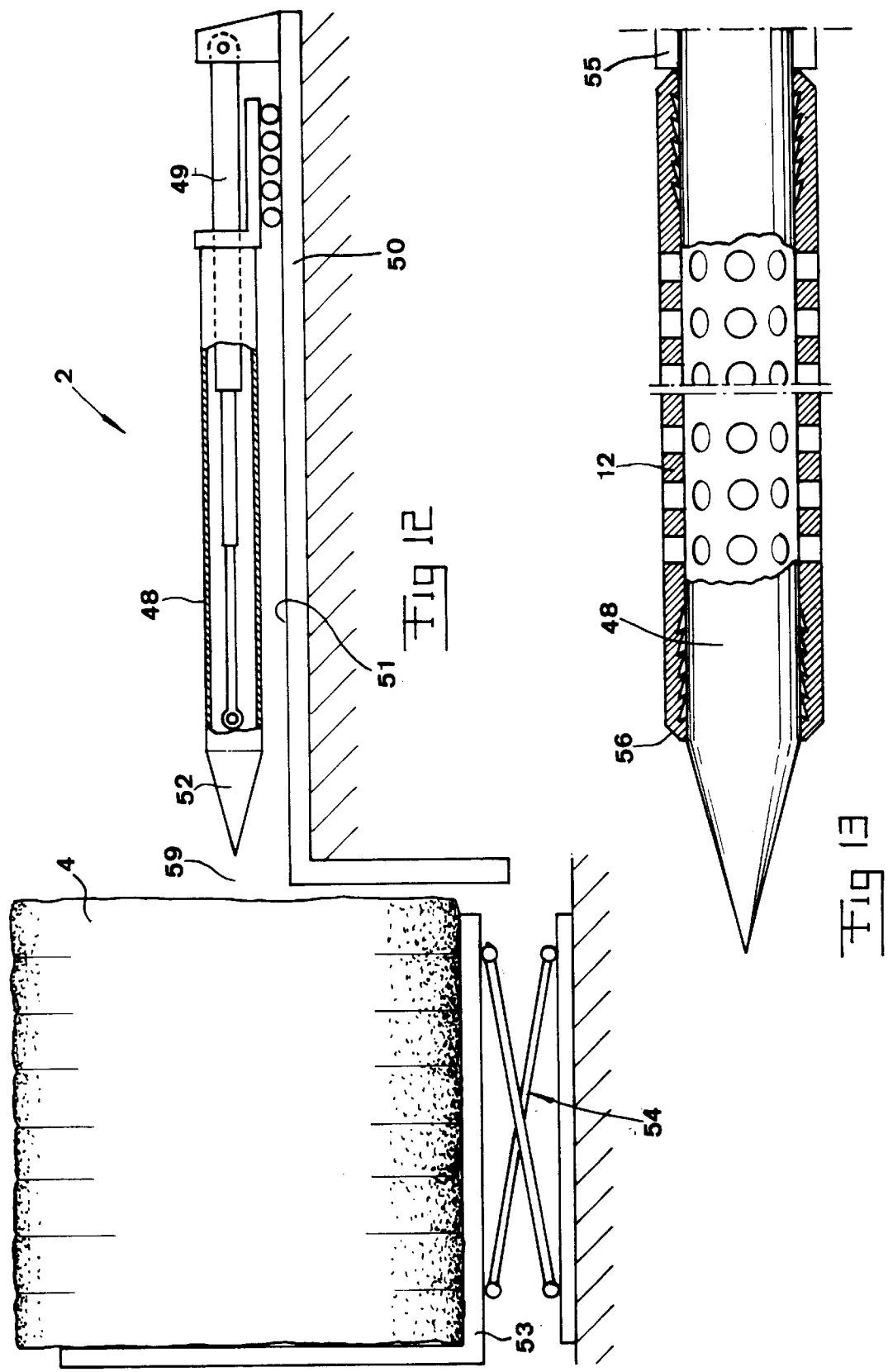

6,079,119

METHOD AND A DEVICE FOR DRYING

FIELD OF THE INVENTION AND PRIOR ART

This invention relates to a method and a device for drying. In addition, the invention relates to a device in tubes for use in this method and this device.

The present invention is primarily intended to be applied for drying of bales of vegetable material. In particular, hay is involved. Although the specification in the following primarily will be focused on drying of hay, it should be kept in mind that the invention also is applicable drying of bodies of other air-permeable material other than just vegetable material.

A method of taking care of the green mass in connection with harvest is directed to formation of roller bales. The material in such roller bales may be ensiled, which normally occurs by covering the bales with a moisture-tight film, normally plastics film. A disadvantage with this technique is the substantial cost for the plastics film and besides, plastics film causes environmental problems. In case the plastics film is damaged, the ensiling effect may be disturbed. Another method of treating roller bales is to dry them. The present invention involves this method. However, it has turned out to be substantially difficulties to efficiently dry the bales. Deficiently dried hay has a low nutritional contents and a poor hygienic quality as a consequence of attack of bacteria and fungi. A consequence of this is poor quality of the milk obtained from animals having eaten the hay. A poor milk quality leads, in its turn, to a deteriorated yield and quality of cheese.

Until now drying of bales of hay by is accomplished either letting them stand outdoors under some kind of rain protection or by placing bales in a drying chamber, in which dry and possibly heated air has been caused to circulate so as to take up moisture from the bales. However, these techniques have turned out to be unsatisfactory. The moisture content in the central areas of the bales has been difficult to reduce to acceptable levels even if it has turned out to be possible to achieve an acceptable dryness in the surface areas of the bale.

SUMMARY OF THE INVENTION

The object of the present invention is to achieve an efficient and uniform drying of bodies of air-permeable material, in particular bales of hay or other vegetable material.

In view of the fact that the method comprises provision of a hole in the body and establishment of a pressure difference between the hole of the body and the surroundings of the body for generating a drying air flow through the body, possibilities are created to achieve a very good and uniform drying of the material. In particular, it is achieved that centrally located body portions may be the subjected to of an entirely satisfactory drying.

It is preferred that the hole in the body contains a tube having an air-permeable mantle. Thus, the tube ensures that the hole in the body is maintained during the drying procedure.

In a preferred embodiment of the invention, several bodies provided with holes are placed adjacent each other for simultaneous drying thereof so that the holes thereof form a continuous chamber. According to one alternative, the bodies may be placed in a stack with the chamber extending substantially vertically through the stack. In this alternative it is achieved that the bodies through their own weight will tend to be pressed against each other, whereby sealing in the interfaces between two adjacent bodies is achieved.

According to another alternative, the bodies are placed in a row with a chamber extending substantially horizontally through the row. In such horizontal location, the row may in practice be made longer than the height of a stack according to the first alternative.

According to a preferred embodiment the device according to the invention, comprises means for interconnection of two tubes belonging to two adjacent bodies, such means are arranged to allow, with a relatively small resistance, movement of the tubes towards each other but to counteract, with a relatively great resistance, movement of the tubes away from each other. Similar means may, according to a further preferred embodiment, be used for interconnection of such a tube of a body and at least one element for sealing connection against an end surface of the body. According to these embodiments, movement of the bodies against each other may occur with at least some compacting of the body, whereafter interconnecting means hold two adjacent bodies or alternatively such a body and a sealing element together so that this holding occurs with a sealing action.

BRIEF DESCRIPTION OF THE DRAWINGS

With reference to the enclosed drawings, a more close description of embodiments of the invention follows hereunder.

In the drawings;

FIG. 2 is a view illustrating drying of a stack of several bales of hay;

FIG. 3 is a detailed view of FIG. 2;

FIG. 4 is a view illustrating means for interconnection of two tubes belonging to two adjacent bales of hay;

FIG. 5 is a diagrammatical view illustrating drying of bales of hay placed in a horizontal row;

FIG. 12 is a side view of an alternative device for producing holes in bales of hay;

FIG. 13 is a view illustrating a press member and a tube carried thereby, the press member being included in the device according to FIG. 12;

DETAILED DESCRIPTION OF PREFERRED EMBODIMENTS

Figure 1:
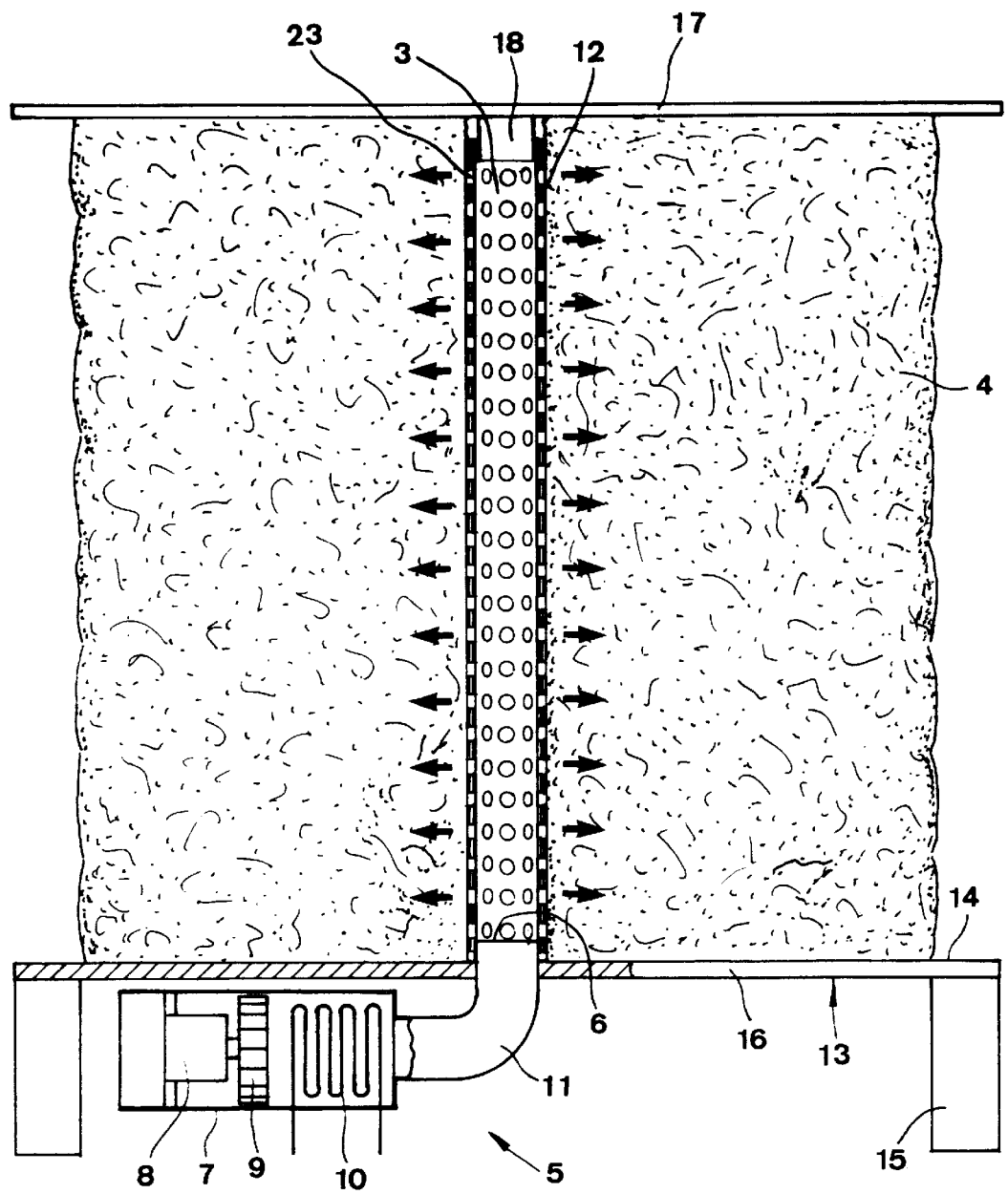
FIG. 1 is a diagrammatical view illustrating application of the invention for drying of a bale of hay.

The device according to the invention comprises means 1 (FIG. 9) and 2 (FIG. 12) for providing a hole 3 illustrated in FIG. 1 in a bale of hay generally denoted as 4. This bale is, in the example, formed by a so-called roller bale.

The device according to the invention comprises, in addition, means 5 for establishing a pressure difference between the hole 3 in the bale and surroundings thereof in order to generate a drying flow of air through the hay in the bale. More specifically, the device comprises a supply opening 6 which may be brought a communication with the hole 3. The means 5 for establishing the pressure difference comprises an arrangement 7, which generates an air flow and communicates with the supply opening 6. This arrangement may suitably comprise a fan 9 driven by a motor 8. Possible, the arrangement may, in addition, comprise members 10 for heating the senerated air flow. The air flow leaves the arrangement 7 via a conduit 11 comprising the supply opening 6.

Thus, drying is carried out by air under pressure being supplied to the hole 3 in the bale 4, the air from the hole 3 flowing outwardly through the hay in the bale towards the surroundings while simultaneously drying the hay.

It is preferred that the tube 12, having an air-permeable mantle, is placed in the hole 3. As appears from FIG. 1, the permeability is achieved by openings or perforations 23 arranged in the tube mantle. The presence of the tube 12 in the hole 3 ensures that the hole does not collapse inadvertently and jeopardize adequate air flow to the interior of the hole. In order to achieve this, the tube 3 is formed of a sufficiently rigid material.

It is preferred that a single hole 3 is arranged in the middle area of a bale. Thus, the drying air will flow from the middle area of the bale in a direction towards the surroundings. However, it is pointed out that more than one hole 3 may be arranged in the bale if desired. This may in particular be the case should the bale have very large dimensions. However, it is normally desirable to provide at least one hole in the middle of the bale in order to ensure that the middle region of the bale, is dried adequately. It is, namely, normally the middle region of the bale to which is most difficult to impart an acceptable dryness.

The longitudinal direction of the hole 3 extends, preferably, axially, and preferably coaxially, in relation to the bale. In roller bales the hole 3 extends parallel to the axis of the bale, this axis generally being the imaginary axis, about which the bale is formed by reeling in the harvesting or bale forming machine.

FIG. 1 illustrates a carrier, generally denoted as 13, for receiving a bale oriented with the longitudinal direction of the hole 3. substantially vertical. The carrier 13 comprises a support surface 14, against which one gable side of the bale 4 resides. The surface 14 is tight, which means that air cannot flow out through the lower gable side of the bale.

The carrier 13 comprises suitable members 15, for instance feet, for support relative to a base. As can be seen from FIG. 1, the device may be such that the air flow generating arrangement 7 is located under the plate 16 forming the contact surface 14.

In order to avoid air deviating upwardly via the upper gable side of the bale, the device comprises an element 17 for sealing connection to this gable side. The element 17 has the character of a sheet or plate and may comprise a projection 18 intended to function in a locating manner by projecting into the hole 3 in the bale. Whereas the plate 17 acts as an upper sealing element, the plate 16 functions as a lower one.

The supply opening 6 is placed so that a bale adequately located on the carrier 13 will have its hole 3 placed so that air from the supply opening enters the hole, more specifically the tube 12 arranged in the hole. The supply opening 6 could consist of an opening flush with the surface 14 but in the example it is illustrated that the supply opening 6 is somewhat raised in that the conduit 11 has a portion projecting above the surface 14 and intended to be received in the hole 3 of the bale. To avoid the ends of the tube 12 contacting the sealing elements 16, 17 or the conduit 11 and thus prevent the gable sides of the bale from contacting the sealing elements 16, 17 in a sealing manner, it is preferred that the tube 12 is at least somewhat shorter than the length of the hole 3, at least in the uninfluenced condition of the bale 4 and suitably also in the condition assumed by the bale under its own weight and the load of elements thereon, such as the sealing element 17.

It is diagrammatically illustrated in FIG. 2 that a vertical stack of bales 4 is orientated with the longitudinal direction of the holes of the bales substantially vertically. The holes form a continuous chamber, more specifically a vertical chamber. This means that the holes 3 are placed substantially opposite to each other in a line. Each of the bales comprises a tube 12 as was just described. The uppermost of the bales has at the top a sealing element 17 avoiding air leaving the uppermost bale upwardly. As just described, the carrier 13 at the bottom prevents air from deviating downwardly from the lowermost bale in the stack. Two adjacent bales abut against each other with their gable sides, a fact which counteracts leakage of air in the interface without this air at the same time drying. The tubes 12 in the bales stop somewhat before the gable sides of the bale so that the tubes in two adjacent bales according to a first embodiment will not contact each other. According to an alternative embodiment, the device may be such that a tube placed in a bale operates in a guiding manner relative to an adjacent bale by projecting into the hole and/or tube thereof. In this way a certain control of the bales against mutual radial movement is achieved.

FIG. 3 illustrates that the air supply opening 6 opens flush with the support surface 14 of the carrier 13. It also appears clearly that the tube placed in the bale terminates inwardly of the lower gable side of the bale.

It appears from FIG. 4 that the device according to the invention may comprise means 19 for interconnection of tubes 12 belonging to two adjacent bales. These means 19 are arranged to allow, with a relatively small resistance, movement of the. tubes towards each other but to counteract, with a relatively great resistance, movement of the tubes away from each other. For this purpose the connection means 19 comprise engagement members 20. According to this first embodiment (an alternative embodiment is described later with the assistance of FIG. 10 and 11) at least one of two adjacent tubes comprises such engagement members 20. These are arranged to establish, on movement of the tubes towards each other, an engagement counteracting movement of the tubes as just mentioned but present a relatively small resistance against movement towards each other as just mentioned. In the embodiment the engagement members are conceived to consist of projections similar to hooks, hitches or barbs. These projections could be designed in one piece with the material of the tubes 12 but could also be made on a separate component secured to one or both of the tubes. In case engagement members are present only on one of two engaging tubes, they are conceived to, on tendency of separation of the tubes, cut into the material of the other tube while preventing or counteracting the separation movement. It is indicated in the example that the engagement members 20 are formed on both of two adjacent tubes, the members being directed so that they, when the tubes are pressed together, slide over each other but hook onto each other on separation. according to this variant, the tubes are conceived to present a female member at one end and a male member at the other end. Thus, a male member such as the one denoted 21 in FIG. 4 is received within the female member denoted 22. Shoulders 24 on the two adjacent tubes delimit their pressing together.

The engagement members 20 could be designed from the same material as the tubes 12 but could also consist of a material harder than the tubes.

In an embodiment according to FIG. 2, where bales are to be stacked onto each other, it is not necessary to use the connection means discussed with respect to FIG. 4. FIG. 5 illustrates, however, a solution where the connection according to FIG. 4 may be valuable. FIG. 5 illustrates, more specifically, that a plurality of bales are placed in a row with the holes 3 in the bales extending substantially horizontally, so that the holes in unison form a chamber extending through the row of bales. Also in this embodiment there are sealing elements 25, 26 occurring at the bales located outermost, the sealing elements being adapted for connection towards the gable sides of the bales 4 located outermost in the row. At least one of the elements, more specifically the one denoted 25, comprises an air flow enabling passage 27 (FIG. 6).

When the bales are provided in a substantially horizontal row, it is suitable to use the connection solution according to FIG. 4 in order to interconnect adjacent bales. As previously tubes 12 according to FIG. 4 are placed in the different bales, the length and design of the tubes being chosen so that the shoulder 24 of an individual tube will be located inwardly of the gable sides of the individual bale. In in other words, this means that on application of two bales against each other, the male portions 21 of the tube in one of the bales will project into the female portion 22 in the tube in the adjacent bale so that the interiors of the two tubes are caused to communicate with each other but without the movement of the tubes towards each other proceeding so far that the shoulders 24 of the two tubes contact each other. However, two adjacent bales should be held against each other so that their gable sides are in abutment against each other while preventing undue air leakage therebetween.

Figure 6:
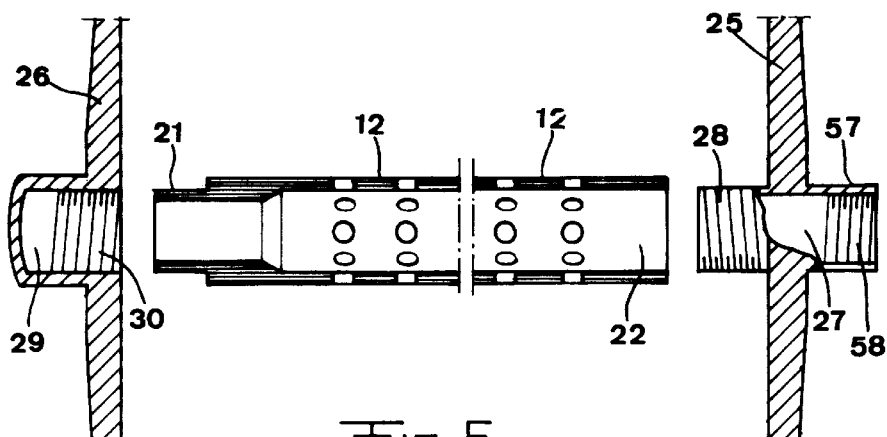
FIG. 6 is a view illustrating a tube intended for location in a bale of hay and two sealing elements for connection thereto.

FIG. 6 illustrates, without bales, the end portions of two tubes 12 conceived to be formed by the outermost tubes placed in a row. As just described, one of the tubes present, at an end thereof, a male portion 21 whereas the other tube comprises a female portion 22. One of the sealing elements, more specifically the one denoted 25, comprises a male member 28 intended to be received in the female portion 22 of one of the tubes 3. The male member 28 on th e sealing element 25 and/or the female portion 22 on one of the tubes 12 comprise means for establishment of an engagement between the seating element 25 and the last-mentioned tube. In the example, these means are formed on the male member 28. More specifically, these means may have the character of a thread which on screwing into the tube 12 is capable of self-threading, i.e. that the thread on the male member 28 by itself cuts corresponding threads in the tube 12 in the course of the sealing element 25 being screwed onto the tube. The screwing occurs until the plate portion of the sealing element 25 abuts against the gable side of an adjacent bale.

The second sealing element 26 and/or the male portion 21 on the second tube 12 also comprise means for establishment of a connection therebetween. In the example, the means are present on the sealing element 26. This has, more specifically, a female member 2 9 capable of receiving the male portion 21 on the tube 12. The connection means are formed by a thread 30 on the wall of the female member 29 and this thread is self-threading so that it on screwing onto the male portion 21 of the tube 12 cuts threads therein. The plate portion of the seating element 26 is intended to be placed in contact against the adjacent gable side of a bale for the purpose of sealing against the same.

Figure 7:
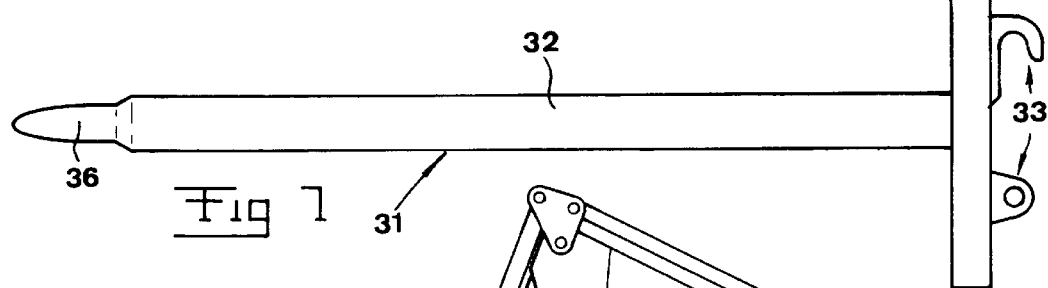
FIG. 7 is a view illustrating a member for handling of bales of hay.
Figure 8:
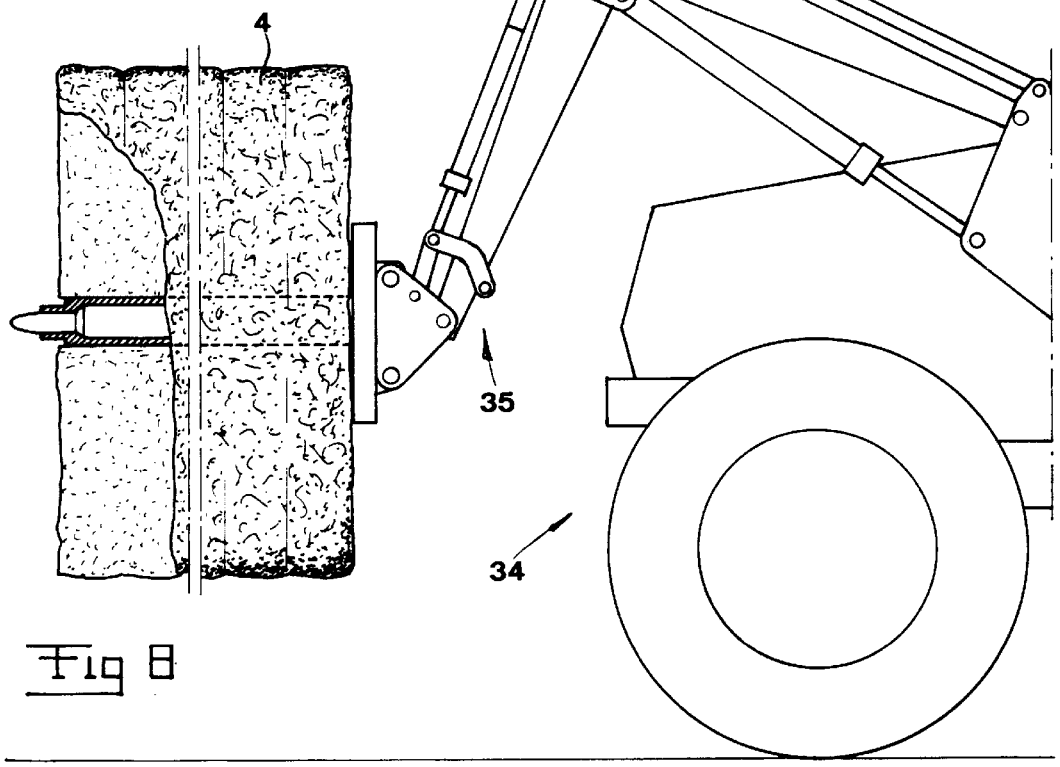
FIG. 8 is a view illustrating the bale handling member according to FIG. 7 in a practical situation of use.

FIG. 7 illustrates means, generally denoted 31, for handling the bales. This means comprises a male carrying member 32 introducable into the tube 12 in a bale and coupling members 33 for coupling the carrying member 32 to a load displacement unit, for instance a vehicle 34 with a loading apparatus 35 diagrammatically indicated in FIG 8. The carrying member 32 comprises an end portion 36 having a tapering design to simplify introduction of the carrying member into a tube 12. As can be seen from FIG. 8, a bale 4 may be carried by means of the carrying member 32, occurring forces being transmitted to the bale 4 via the tube 12.

Figure 9:
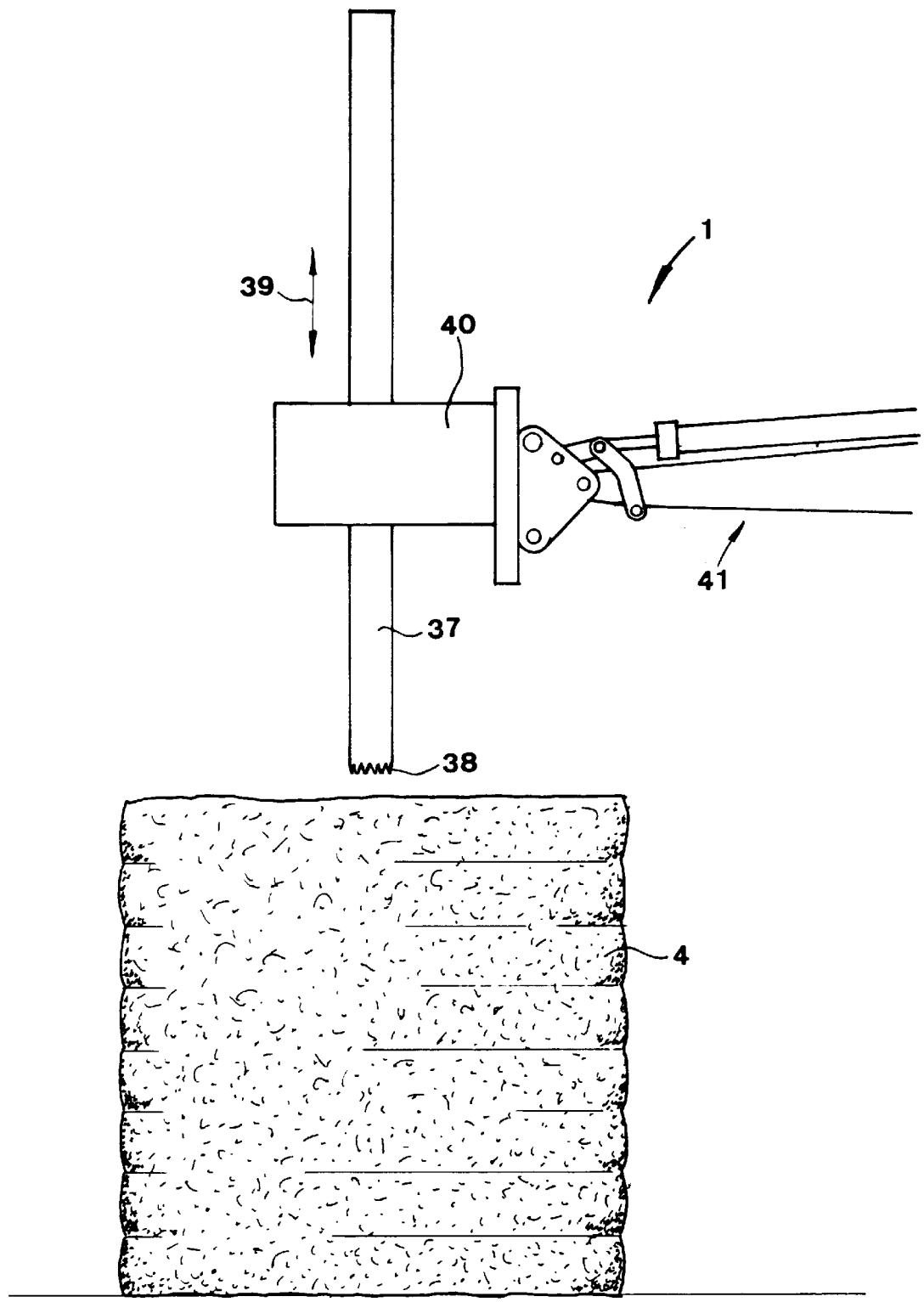
FIG. 9 is a view illustrating a device for provision of holes in bales of hay.

FIG. 9 illustrates that means for providing a hole in the body comprises a cutting member 37 having a tubular shape. One end of the cutting member comprises cutting bits 38. The cutting member 37 is adapted to provide the hole in the bale 4 by being moved through the bale. As indicated with the arrow 39, the cutting member 37 may be movable vertically in relation to a holder 40, which in turn is carried by a suitable carrier structure 41, for instance in the form of a crane or loading apparatus, which may be placed on a vehicle. It is preferred that the cutting member 37 has the character of boring tool since it is conceived to be put into a rotating movement while providing the hole in the bale. Thus, the holder 40 comprises means for rotating the tubular cutting member 37. It is preferred that the bale 4 during the production of the hole therein is orientated with its geometrical axis vertical so that also the cutting tool 37 is vertical.

Figure 10:
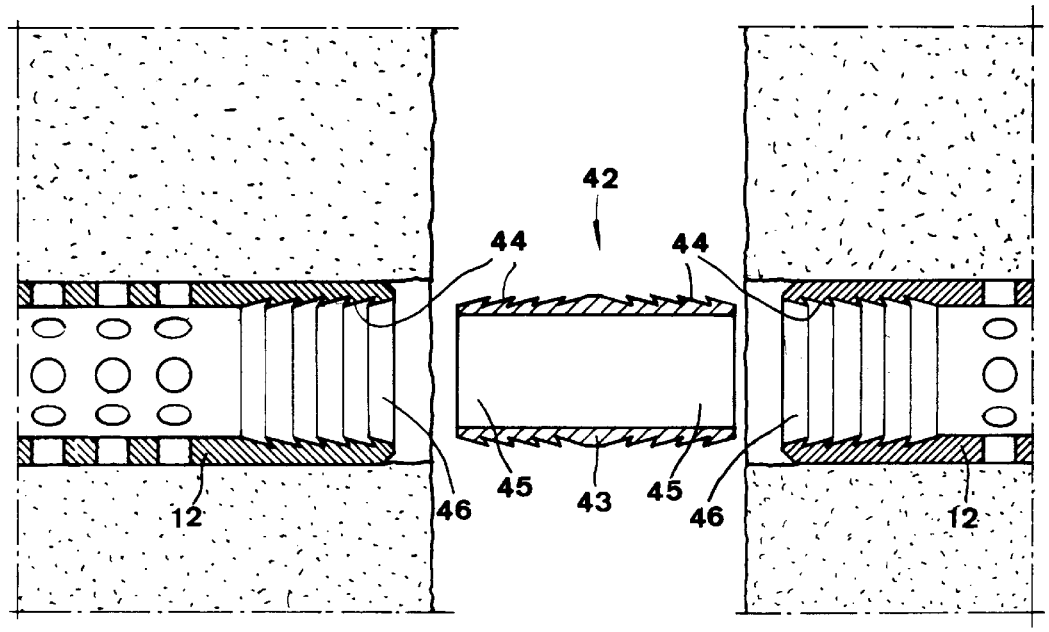
FIG. 10 is a view illustrating alternative means for interconnection of tubes belonging to two bales of hay.
Figure 11:
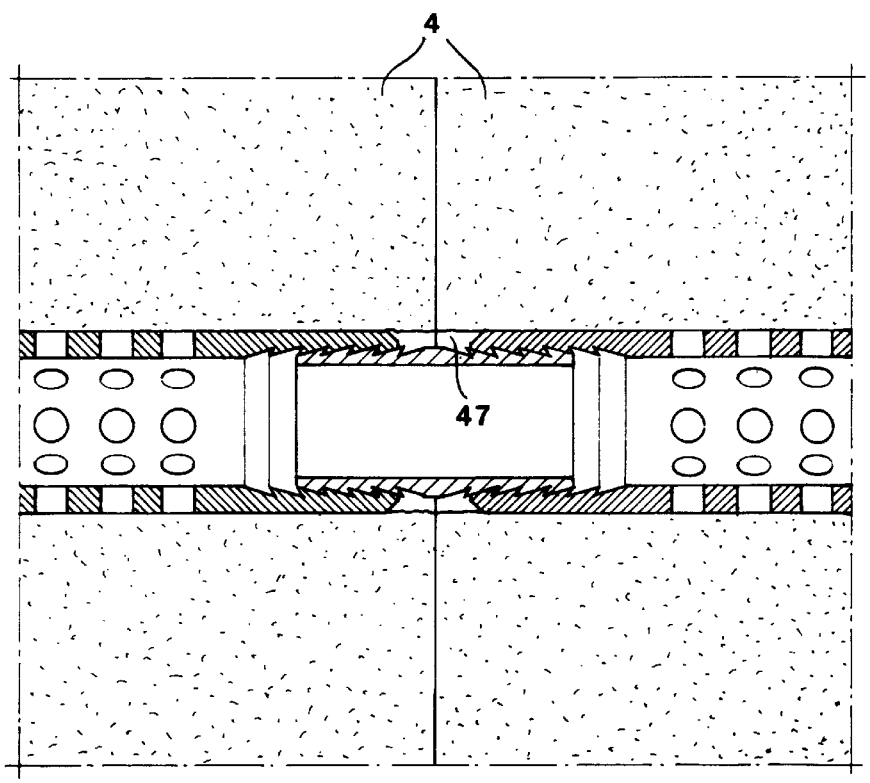
FIG. 11 is a view corresponding to FIG. 10 but illustrating the occurring elements assembled.

An alternative design of means 42 for mutual connection of tubes 12 belonging to two adjacent bodies is illustrated in FIGS. 10 and 11. As in the case previously described with assistance of FIG. 4, engagement members 44 are present also here and are arranged to allow, with a relatively small resistance, movement of the tubes 12 towards each other but to counteract, with a relatively great resistance, movement of the tubes away from each other. In this embodiment the connection means comprises a particular coupling piece 43. The engagement members 44 are arranged on this coupling piece and/or on the tubes 12. More specifically, the coupling piece 43 comprises male portions 45 adapted to be received in female end portions 46 of the tubes 12 in a manner appearing from FIG. 11. In the example both the coupling piece 43 and the female portions 46 comprise the engagement members 44 described, which may have the character of hook, hitch or barb-like members. For instance, the coupling piece 43 itself could comprise engagement members 44 and consist of a material at least somewhat softer than the tubes 12 so that the engagement members 44 of the tubes 12 could be capable of cutting into the material of the coupling piece 43.

It is preferred in this regard that the tubes 12 are made reusable by being prepared from a material allowing multiple usage, for instance plastics or sheet metal. The coupling pieces 43, on the contrary, are preferably produced for one-time use, and may possibly be prepared from paper, cardboard or possibly plastics having lowbales are this means that when two bales are separated, the coupling piece 43 present between the tubes 12 of these bales will be more or less destructed or broken, From that stated above it appears that an individual tube is intended to comprise female portions 46 at its both ends.

It appears from FIG. 11 that two bales 4 are placed with their gable sides against each other whereas a coupling piece 43 interconnects the tubes 12 of the adjacent bales. As is indicated by means of the interspace 47 in FIG. 11 between the ends of the tubes 12, the tubes are not intended to contact each other when two adjacent bales are interconnected.

The coupling piece 43 comprises an internal through-cavity so that a continuous chamber is formed within several tubes. interconnected by means of coupling pieces.

It is preferred that a tube 12 located in a bale 4 is placed in a hole in the bale with press fit so that the tube is secured in the bale to a required degree. As an alternative or complement thereto, it would be possible to provide the external surface of the tube with a design suitable for anchoring the tube in relation to the surrounding material in the bale in a more or less distinct manner. From that stated, it appears that on provision of a hole in the bale with subsequent introduction of a tube therein, the hole is suitably prepared with a smaller diameter than the external diameter of the tube so that the tube to some extent must be pressed into the hole.

This pressing technique is even more pronounced in the embodiment according to FIG. 12, where the means 2 for providing the hole in the body is shown as consisting of a press member 48, which together with a tube carried thereby (see FIG. 13) may be pressed into the bale 4. A power member 49 acts between a point on the pressure member 48 and a point on the frame 50. This power member is of a type having variable length and may, as appears from FIG. 12, extend partly within a cavity in the press member 48. The press member 48 may be a carriage or slide, which is movable reciprocatingly along a path 51 of movement by means of the power member 49. The press member 48 comprises a pointed end 52 to simplify penetration into a bale 4.

It appears from FIG. 12 that the carrier 53 is adapted to carry a bale 4 which is intended to be provided with a tube 12. It is preferred that the carrier 53 is associated with an arrangement 54 to adjust the position of the carrier 53 vertically so as to adjust the axis of the bale opposite the axis of the press member 48.

It appears from FIG. 13 that a tube 12 may be placed onto the press member 48. The press member comprises at the rear part thereof, support members 55 to support one end of the tube 12. The forward end of the tube 12 located most closely to the tip 52 is suitably intended to be located in the area of the transition between the tip 52 and the other portion of the press member 42, the other portion being substantially cylindrical. It is suitable that at least one of the ends of the tubes 12 comprises a bevelling as at 56 to simplify penetration into the bale.

A space 59 between the press member 48 and the bale 4 is illustrated, in FIG. 12, as being rather limited. According to a preferred embodiment of the invention this is only a theoretical compression of the figure. It is preferred that the space 59 is made so large that it will be possible to thread a tube 12 onto the press member 48 via the end 52 thereof at the same time as a bale 4 is in its place. Thus, the space 59 should have a length parallel to the longitudinal direction of the press member 48 which is at least equally large as the length of the tube 12.

On use of the device illustrated in FIGS. 12 and 13 the bale 4 is initially adjusted vertically by means of the arrangement 54 so that the center of the bale becomes located opposite to the press member 48. A tube 12 is placed on the latter and the power member 49 is then activated so that the press member 48 with the accompanying tube is pressed into the bale. The tip 52 will then form and successively widen the hole so that the tube 12 may enter the same. Since in this embodiment material is not removed from the bale, the tube will, when it has received its final location, subjected to a press fit in the hole. This embodiment has the advantage that all material remains in the bale and will be subjected to drying.

The operation in the embodiment according to FIGS. 1–5 has already been mentioned. As far as FIG. 6 is concerned, it should be pointed out as a complement that when a row of: bales has been prepared and the sealing elements 25 and 26 have been placed outermost at the ends of this row, an air flow generating arrangement similar to the one previously described and denoted 7 is connected to a connection means 57, suitably via a conduit. The connection means 57 may to be a tube piece provided with an internal thread 58 adapted for thread engagement with the coupling piece on the conduit just mentioned.

It is pointed out with regard to the design of the tubes according to FIG. 10 and 11 that it is intended that the coupling pieces 42 according to FIG. 10 shall serve as means for connecting the sealing elements 25, 26 to the tubes. As regards the sealing element 26 according to FIG. 6, the internal thread 30 thereof is conceived to be externally screwed onto a portion of a coupling piece 42 projecting out of a tube 12, the coupling piece portion forming a male projection from the tube. As far as the sealing element 25 is concerned, the externally threaded male member 28 (see FIG. 6) thereof is conceived to be modified so that it comprises, instead, an internal thread capable of being screwed onto an end portion of a coupling piece 42 projecting out of a tube 12 according to FIG. 10. It is in this connection pointed out that the coupling pieces 42 may be entirely or substantially entirely smooth on their external sides so that only the engagement members 44 are present on the tubes 12.

As an alternative to providing the hole in the bales after their production, for example by the means appearing from FIGS. 9 and 12–13, it is possible to form the bale about a hole-forming element in connection with the bale production, for instance by winding a mat of hay around the hole-shaping element. This hole-shaping element could be formed by a tube 12 of the kind described or alternatively of a pin-like body, which after formation of the bale is withdrawn from the hole and replaced by a tube corresponding to that 12 dealt with above.

Figure 14:
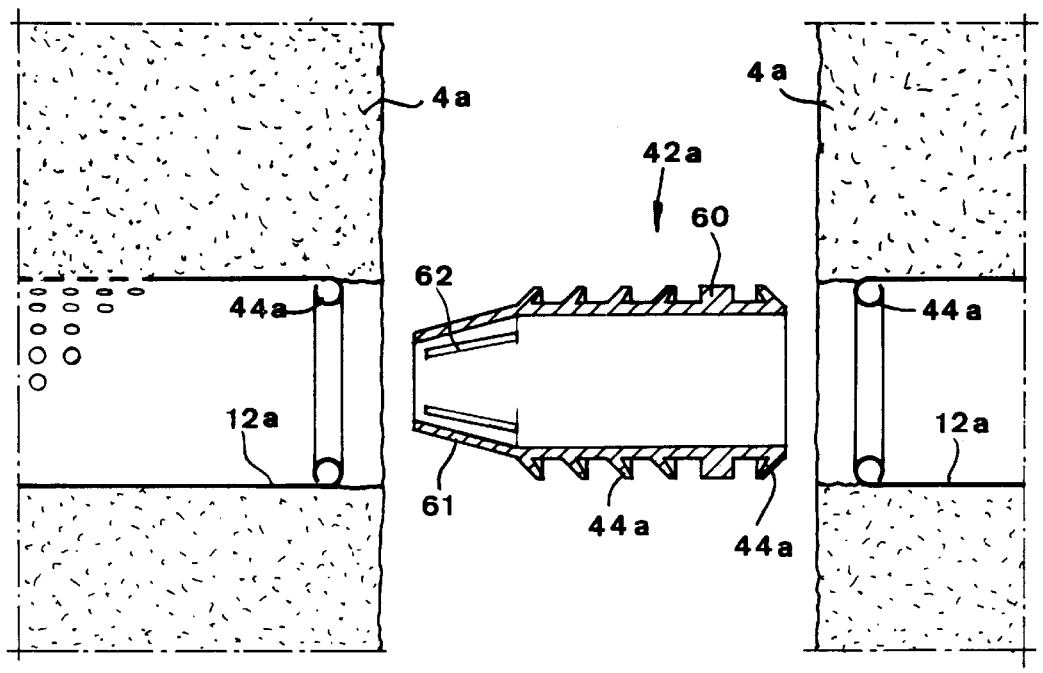
FIG. 14 is a view similar to FIG. 10 of an alternative embodiment.
Figure 15:
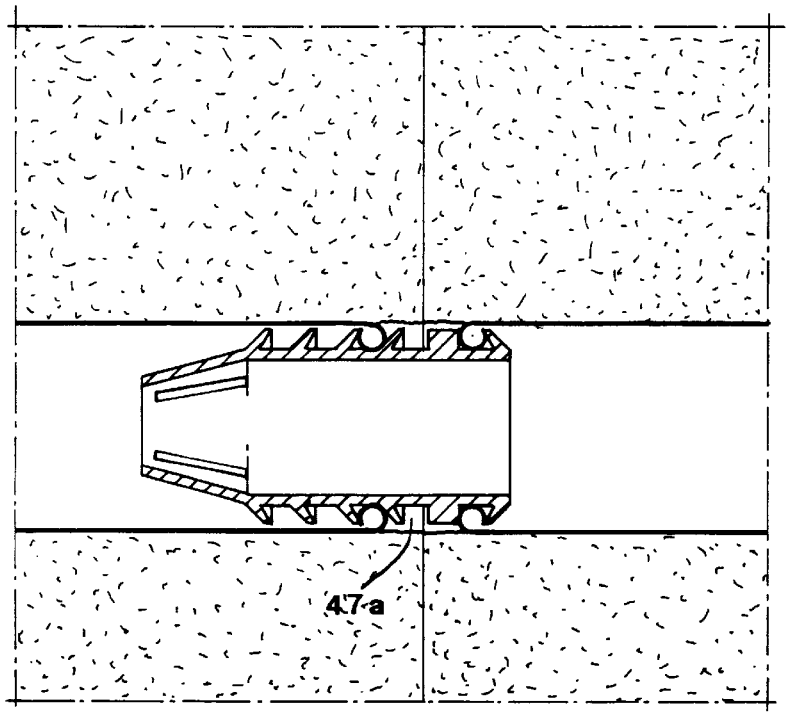
FIG. 15 is a view similar to FIG. 11 of the alternative embodiment.

In the description of the variant in FIGS. 14 and 15 like reference characters as in FIGS. 10 and 11 will be used, only with addition of the letter a. In this embodiment, the tubes 12a present, at their ends, engagement members 44a being annular ridges located at the ends of the tubes 12a. These ridges may be achieved by rolling inwardly of the end material of the tubes. In this embodiment the tubes 12a consist of sheet metal although also other materials may be involved. The coupling piece 42a presents engagement members 44a having the character of annular flanges located in a sloping relation so that the coupling piece 42a becomes introducable into a respective tube 12a with a relatively small resistance. However, when the ridge 44a is located behind individual flanges 44a of the coupling piece 42a, those flanges will by their barb-like inclination or slope counteract movement of the coupling piece and tubes away from each other. This means that if two adjacent bales 4a have been pressed against each other and an individual coupling piece 42a is located in engagement with the tubes of the adjacent bales, the bales will abut sealingly against each other and the coupling piece 42a will maintain, in cooperation with the tubes 12a, the bales in a sealing relation unless the bales are forced away from each other with a comparatively great force. The individual coupling piece 42a is asymmetrical in the example since it comprises one single member or flange 44a for cooperation with one of the tubes 12a whereas it comprises several such members/flanges 44a for cooperation with the ridge of the other tube. This is a consequence of the coupling piece 42a having an annular shoulder 60, which can be said to form a stop for contact against the end of one of the tubes 12a in a manner appearing from FIG. 15. Thus, when the ridge of one of the tubes 12a is located between the stop member 60 and the flange 44a located to the right thereof, the coupling piece is locked to the right tube whereas the part of the coupling piece located on the opposite side of the stop member 60 is pressed into the other of the tubes so that the ridge 44a thereof will be located behind one of the flanges 44a of the coupling piece. Thus, the coupling piece 42a will, as a rule, project more into one of the adjacent tubes 12a than into the other.

As in the preceding embodiment, the coupling piece 42a may, if desired, be manufactured from such a material that it obtains the character of a one-time usage component. However, it is also conceivable to design the coupling piece 42a for multiple usage. Conceivable materials for the coupling piece are, as before, plastics, paper, cardboard etc. As described in the embodiment according to FIGS. 10 and 11, there is also here a free interspace 47a between the two adjacent tubes 12a when two bales are pressed against each other.

It appears from the figures that the coupling piece 42a may present a conical portion 61 simplifying introduction of the coupling piece 42a into an end of a tube 12a when the other end of the coupling piece already is coupled to the tube 12a of a bale. In order not to reduce the air flow cross section through the coupling member 42a excessively by means of the conical or otherwise tapering portion 61, it may comprise slots or holes 62 promoting flow of air therethrough. For the rest, the coupling piece 42a is of course provided with an internal through passage for air flow.

Figure 16:
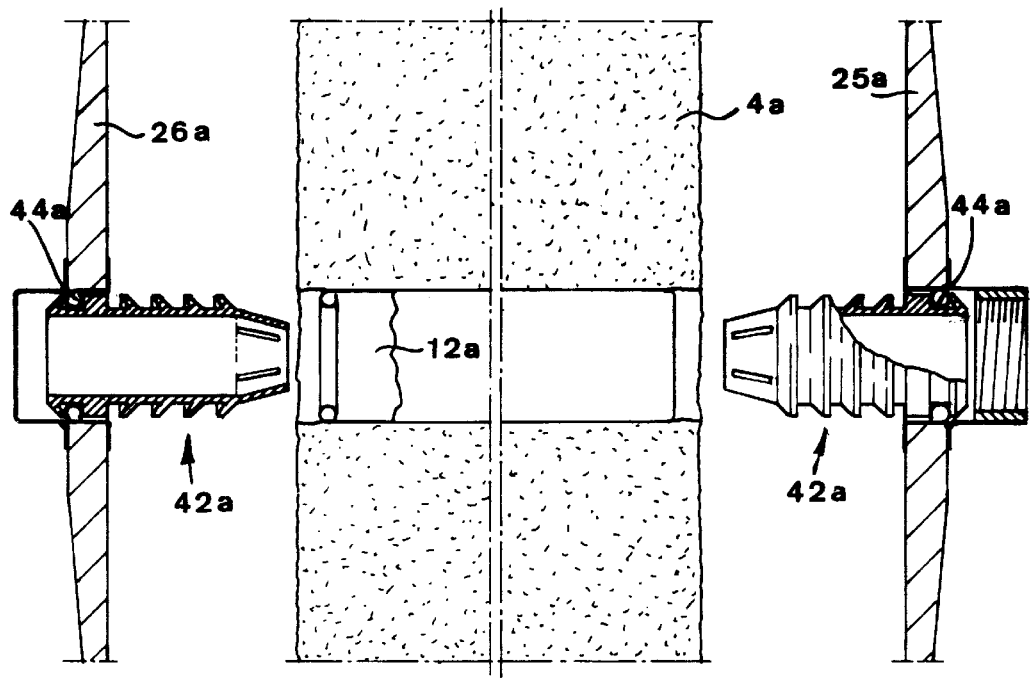
FIG. 16 illustrates diagrammatically in a way somewhat similar to FIG. 6 how two sealing elements may be brought to sealingly cooperate with a body provided with a tube.

It is illustrated in FIG. 16 that the coupling pieces 42a also may be used to connect sealing elements 25a and 26a respectively to the tube 12a of a bale 4a. For this purpose, the coupling pieces 42a comprises, as before, flange-like engagement members 44a adapted to engage with the engagement members 44a on the ends of the tube 12a. The elements 25a and 26a present, themselves, engagement members 44a similar to those of the tube 12a so that, accordingly, the coupling pieces 42a may be brought into a securing relation with the elements 25a and 26a in analogy to what has been described with reference of FIGS. 14 and 15. When the coupling pieces 42 have been brought into a retaining connection with the elements 25a and 26a, the projecting ends of the coupling elements 42a may be pressed into the tube 12a of the bale 4a.

It is of course realized that the tube ends illustrated in FIG. 16 may be formed by the ends of one and the same tube or alternatively of the ends of two different tubes located outermost in a row of bales.

Figure 17:
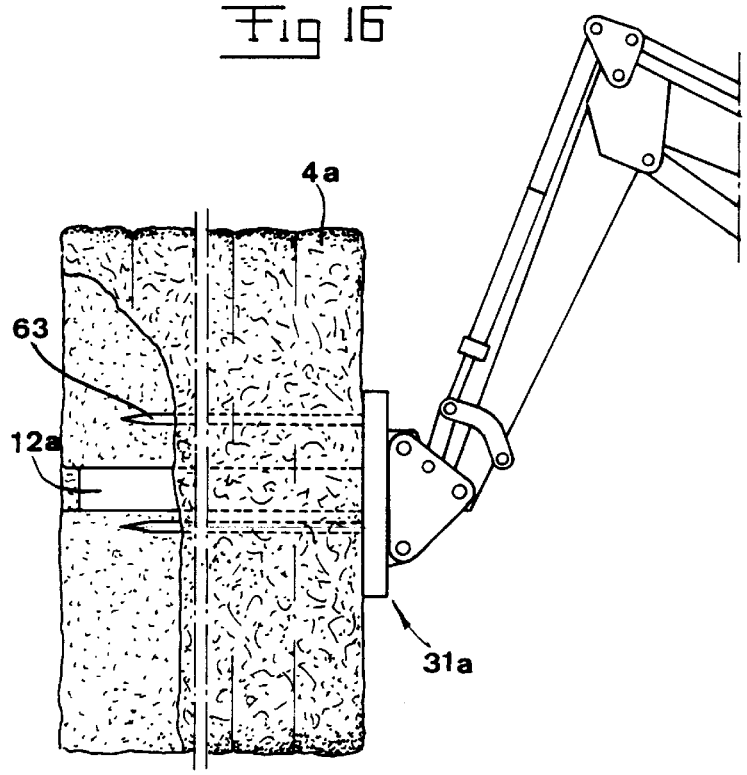
FIG. 17 illustrates an alternative to the embodiment in FIG. 8.

In the variant according to FIG. 17, it is illustrated that means 31a for handling of a bale 4a does not necessarily have to engage in a tube 12a located in the bale but instead the means may present elongated spear-like members 63 adapted to protrude into the bale sidewardly of the tube 12a in order to enable bale handling in this way. This involves the advantageous con sequence that carrying forces do not have to be exerted on the bale 4a via the tube 12a. Of course, an arbitrary number of spears 63 may occur; in the example the number of spears is intended to be 3 in equilateral-triangle distribution.

The invention is of course not only restricted to the embodiments discussed hereinabove. Numerous modifications may, accordingly, be made within the scope of the invention. For example, it is pointed out that it is not an indispensable requirement that drying air be supplied to the hole in the bale/body so that the drying air is caused to move from the hole in a direction, towards the periphery of the body. Thus, it would instead be possible to establish the pressure difference in the way that a higher air pressure occurs externally of the bale than in the hole 3 so that, accordingly, drying air would flow from the periphery of the bale inwardly into the hole 3 in the bale and out through an evacuation conduit from the hole or simply through an outlet at one or both ends of the hole. In such an embodiment tubes 12 would still be used. The man skilled in the art realises also other possible modifications.

What is claimed is:

1. A method for simultaneously drying bodies of air-permeable material, comprising the steps of: providing a hole in each body, said hole containing a tube having an air permeable mantle and placing said bodies adjacent to each other so that the holes thereof form a continuous chamber, interconnecting two adjacent bodies by connecting the tubes belonging to the two, adjacent bodies by interconnecting means so that the two bodies abut against each other while preventing undue air leakage therebetween, said interconnecting means being arranged to allow, with a relatively small resistance, movement of the tubes towards each other but to counteract, with a relatively great resistance, movement of the tubes away from each other and establishing a pressure difference between the hole in said each body and the surroundings of the body for generating a drying air flow through the body.

2. A method according to claim 1, further comprising the step of communicating a supply opening with the hole and supplying air under pressure to the hole via the supply opening for causing air to flow from the hole through the body towards the surroundings.

3. A method according to claim 2, wherein the bodies are placed in a stack with said chamber extending substantially vertically through the stack.

4. A method according to claim 3, wherein the bodies are placed in a row with said chamber extending substantially horizontally through the row.

5. A method according to claim 1, wherein at least one element is adjoined sealingly against an end surface of at least one body placed in a row or a stack of bodies.

6. A method according to claim 5, comprising the step of supplying air to the interior of the tube through the passage which allows flow of air in the element.

7. A method according to claim 6, wherein a tube belonging to a body and said at least one element are interconnected by connecting means adapted to allow, with a relatively small resistance, movement of the tube and the element towards each other but to counteract, with a relatively great resistance, movement of the tube and the element away from each other.

8. A device for drying a plurality of bodies of air-permeable material, comprising means for forming a hole in each body, means for establishing a pressure difference between the hole in the body and the surroundings of the body for generation of a drying air flow through the body; and tubes having air-permeable mantles and provided in holes in the bodies, and means for interconnecting tubes belonging to two adjacent bodies, said means being arranged to allow, with a relatively small resistance, movement of the tubes towards each other, but to counteract, with a relatively great resistance, movement of the tubes away from each other.

9. A device according to claim 8, wherein said tubes and said interconnecting means are arranged to hold two adjacent bodies with sides thereof in abutment against each other while preventing undue air leakage therebetween.

10. A device according to claim 9, wherein said connecting means comprises one of hook, hitch and barb like engagement members.

11. A device according to claim 10, wherein said engagement members are provided in one piece with the material of the tubes.

12. A device according to claim 11, wherein said means for establishing the pressure difference comprises a supply opening adapted to communicate with the hole and an air flow generating arrangement communicating with the supply opening.

13. A device according to claim 12, further comprising a carrier for receiving a body or stack of bodies oriented with the longitudinal direction of a hole extending in the body or stack of bodies being substantially vertical.

14. A device according to claim 8, further comprising at least one element for sealing connection against an end surface of at least one body placed in a row or stack of bodies.

15. A device according to claim 14, wherein said sealing element comprises a passage enabling flow of air.

16. A device according to claim 15, wherein the sealing element and the tubes comprise interconnecting means for interconnection thereof.

17. A device according to claim 16, wherein connecting means are arranged to allow, with a relatively small resistance, movement of the sealing element and the tubes towards each other but to counteract, with a relatively great resistance, movement thereof away from each other.

18. A device according to claim 17, wherein said connecting means comprise one of hook, hitch or barb like engagement members.

19. A device according to claim 16, wherein said interconnecting means comprises coupling pieces separate from at least one of the tubes and the sealing elements.

20. A device according to claim 8, wherein the means for preparing a hole in the body is adapted for one of the following:
 a) prepare the hole after production of the body, and
 b) form the body about a hole-forming element.

21. A device according to claim 8, wherein the means for preparing the hole in the body is formed by a press member which, together with a tube carried thereby, is adapted to be pressed into the body.

22. A device according to claim 8, wherein the means for handling the bodies comprises a male carrying member introducable into the tube in a body and coupling members for coupling the carrying member to a load displacement unit.

23. A device in tubes for use in drying a plurality of bodies of air-permeable material, comprising an air-permeable mantle for enabling, when a tube is introduced into a hole in each body, a drying flow of air through the body between the interior of the tube and the surroundings, and means for interconnecting the tubes belonging to two adjacent bodies, said means being arranged to allow, with a relatively small resistance, movement of the tubes towards each other, but to counteract, with a relatively great resistance, movement of the tubes away from each other.

24. A device according to claim 23, wherein said tubes and said interconnecting means are arranged to hold two adjacent bodies with sides thereof in abutment against each other while preventing undue air leakage therebetween.

25. A device according to claim 23, wherein said interconnecting means comprise one of hook, hitch or barb like engagement members.

26. A device according to claim 25, wherein the engagement members are prepared in one piece with the material of the tubes.

27. A device according to claim 23, wherein said interconnecting means comprises separate coupling pieces connectable to the tubes.

28. A device according to claim 27, wherein the separate coupling pieces comprise engagement members for engagement with the tubes.

29. A device according to claim 8, wherein the bodies are formed by bales of vegetable material.

* * * * *